W. J. WAMBAUGH.
METHOD OF PRODUCING LAMP CHIMNEYS.
APPLICATION FILED JULY 12, 1911.

1,042,857. Patented Oct. 29, 1912.

WITNESSES

INVENTOR
William J. Wambaugh
BY
ATTORNEYS

UNITED STATES PATENT OFFICE.

WILLIAM JACOB WAMBAUGH, OF MORGANTOWN, WEST VIRGINIA.

METHOD OF PRODUCING LAMP-CHIMNEYS.

1,042,857. Specification of Letters Patent. Patented Oct. 29, 1912.

Application filed July 12, 1911. Serial No. 638,118.

*To all whom it may concern:*

Be it known that I, WILLIAM J. WAMBAUGH, a citizen of the United States, and a resident of Morgantown, in the county of Monongalia and State of West Virginia, have invented a new and Improved Method of Producing Lamp-Chimneys, of which the following is a full, clear, and exact description.

Lamp chimneys having "beaded" or "bell" tops as heretofore produced, have required a greater thickness of glass at the top than elsewhere in the chimney, and because of such increased thickness of material the unequal expansion and contraction of the top and body of the chimney has a tendency to cause such chimneys to crack and break. Again, where such chimneys with relatively thickened tops have been ornamented by molding in dies or molds, as is generally the case, the chilling of the glass during the process of molding and stretching, or otherwise shaping the glass, while not sufficiently pliable, destroys the molecular arrangement of the glass and renders it brittle. Also the molds employed in ornamenting the tops have a tendency to scratch the glass, rendering the tops liable to crack off under slight variations of temperature, and, furthermore, because of the necessity of providing a relatively thick top to permit of the ornamental processes as heretofore carried out, the manufacture of such chimneys is relatively difficult.

The object of the present invention, therefore, is to produce a lamp chimney having an ornamental top which does not require a relative increase in thickness of glass at the top, but in which the top and body of the chimney are of uniform or substantially the same thickness, thus doing away with the excess of breakage due to unequal expansion and contraction of the relatively thick top and thin body.

To the above ends, the present invention consists of the improved method of making glass lamp chimneys which will be hereinafter described and claimed.

Reference is to be had to the accompanying drawings forming a part of this specification, in which similar characters of reference indicate corresponding parts in all the views, and in which—

Figure 1:
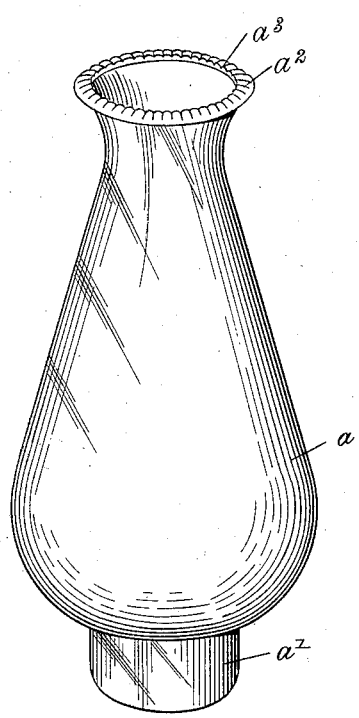
Figure 2:
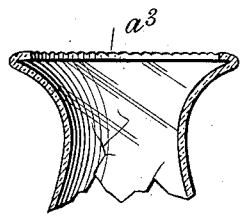
Figure 3:
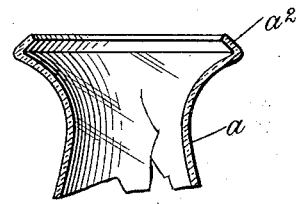

Figure 1 shows in perspective a lamp chimney made in accordance with the method to be described. Fig. 2 shows a vertical sectional view through the upper part of the chimney as it appears after the indentations have been formed in the top. Fig. 3 shows a vertical sectional view through the upper part of the chimney as it comes from the mold.

The chimney comprises the usual pear-shaped body part $a$, having at its lower end the flange or collar $a'$, and at its upper end the ornamental flange $a^2$. This flange $a^2$, as it comes from the mold, extends inward and upward at an angle to the body part $a$, as seen clearly in Fig. 3 of the drawings, and, as shown therein, it is of substantially the same thickness as the body part, and is entirely produced by the ordinary methods of blowing and molding glass by mechanical means.

The chimney, after it comes from the mold, as shown in Fig. 3, is heated at its top part, for the purpose of softening the glass, and thereafter the flange $a^2$ is acted upon by suitable dies, whereby it is beaded or indented, or otherwise ornamented, as shown at $a^3$.

The completed chimney has the appearance of those which are made with the relatively thickened tops, and otherwise has all the advantages of such a chimney.

In forming the chimney two of them may be molded together and divided upon a line which would leave the upwardly-inclined flange $a^2$, as shown in Fig. 3, and because this flange is of the same thickness as the body of the chimney, it may be readily re-heated for the purpose of ornamentation, and only a light pressure is required to form ornamental indentations, or to bend the flange to the angle desired, as shown in Fig. 2.

Having thus described my invention, I claim as new and desire to secure by Letters Patent:—

1. The method of producing glass lamp chimneys having ornamental tops which consist in molding the chimney with a flange surrounding its top, and extending inward and upward with relation to the body portion of the chimney, and of substantially the same thickness as the body portion, and thereafter heating and bending said flange downward and inward.

2. The method of producing glass lamp chimneys having ornamental tops which consists in molding the chimney with a flange surrounding its top, and extending inward and upward with relation to the body portion of the chimney, and of substantially the same thickness as the body portion, and thereafter heating and bending said flange downward and inward, and simultaneously indenting the same.

In testimony whereof I have signed my name to this specification in the presence of two subscribing witnesses.

WILLIAM JACOB WAMBAUGH.

Witnesses:
F. C. SHRIVER,
R. SMITH.

Copies of this patent may be obtained for five cents each, by addressing the "Commissioner of Patents, Washington, D. C."